March 18, 1969

E. G. S. THYER 3,433,467

TRANSFER VALVES

Filed March 8, 1967

INVENTOR
EDWARD G. S. THYER

BY Stevens, Davis, Miller & Mosher

ATTORNEYS

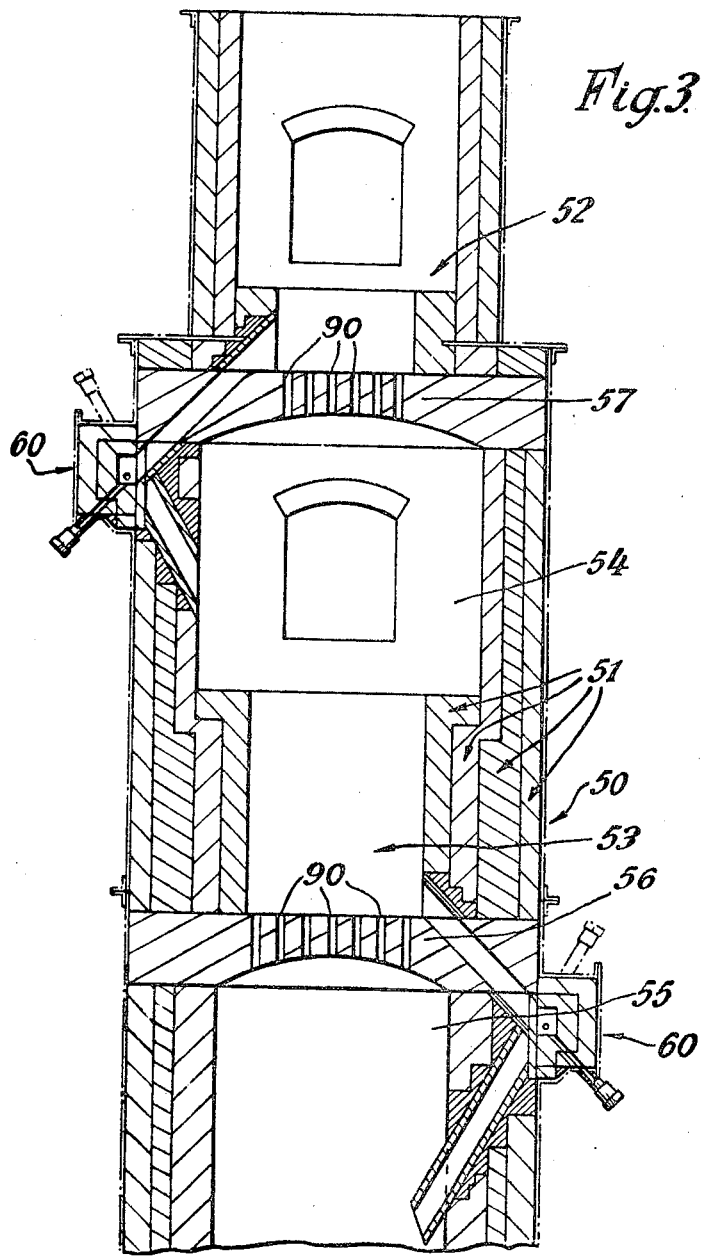

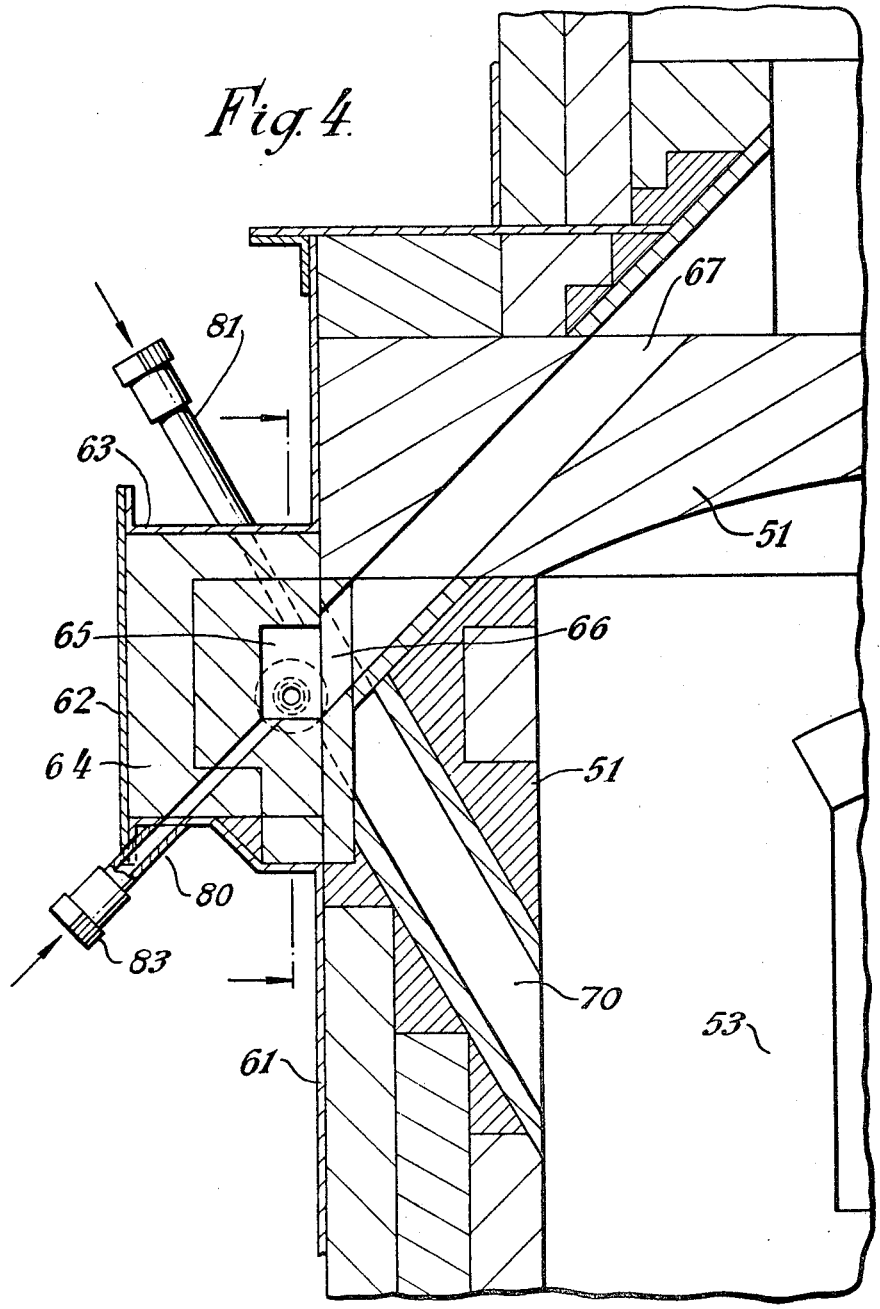

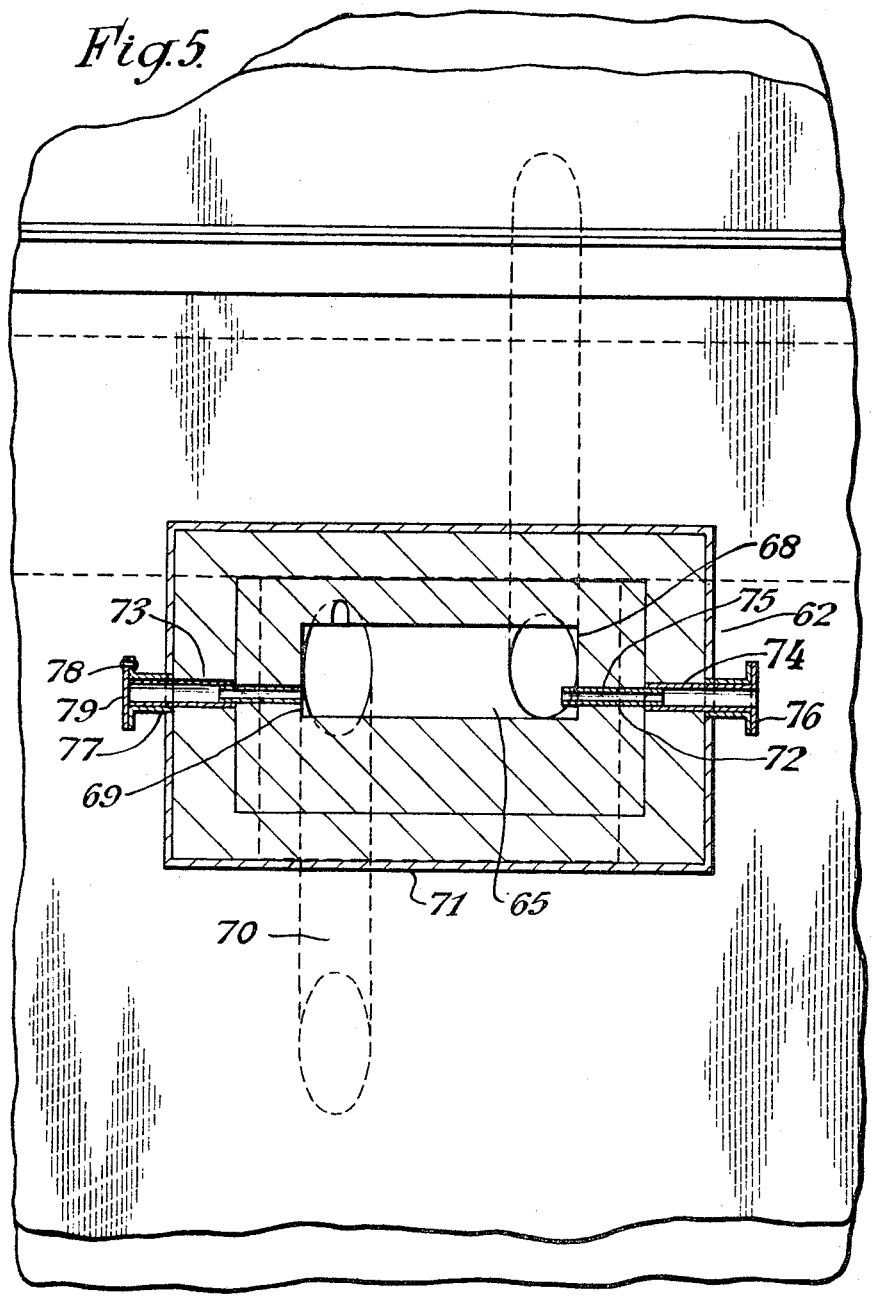

United States Patent Office 3,433,467
Patented Mar. 18, 1969

3,433,467
TRANSFER VALVES
Edward G. S. Thyer, Kent, England, assignor to Fawkham Developments Limited, Borough Green, Kent, England
Filed Mar. 8, 1967, Ser. No. 621,643
Claims priority, application Great Britain, May 16, 1966, 21,711/66
U.S. Cl. 263—21
Int. Cl. F27d 3/10; F27b 15/08, 15/18
7 Claims

ABSTRACT OF THE DISCLOSURE

This invention relates to a transfer valve for the transfer of a flowable particulate material from an upper level to a lower level. The valve comprises a horizontally disposed longitudinal body member, having an inlet at one end and an outlet at the other. The body member is provided at the inlet end with gas means to subject material in the body member to a stream of compressed gas. In use, the particulate material enters the inlet, and accumulates therein to obstruct the inlet and the inlet end of the body member and on activating the gas means, the particles of solid material are caused to flow along said body member and the outlet thereto to be discharged from the valve. On deactivating the gas means, the material again accumulates in the inlet to create a seal between said upper level and said lower level.

---

The present invention relates to transfer valves and in particular to valves for effecting the transfer of a flowable particulate solids material from one level of an apparatus to another level of an apparatus usually against a low gas back pressure.

According to the present invention, there is provided a transfer valve for a flowable particulate solids material which valve comprises a body member having spaced inlet and outlet means and a gas means adapted to act in said body member to subject material therein to a stream of compressed gas, the arrangement being such that when said solids material is caused or allowed to enter said inlet means, said material substantially seals said inlet means and on operating said gas means, the material sealing the inlet means is subjected to a stream of compressed gas to effect transfer of said material from said inlet to said outlet thereby permitting a flow of the solids material through said valve. The gas stream may be a stream of compressed air.

The body member may be of any convenient shape while permitting transfer of material from the inlet means to the outlet means of the valve. The body member preferably has a longitudinal form extending between said inlet means and said outlet means and may typically be of cylnidrical, rectangular or square cross section. The valve may be incorporated within the refractory lining of a multilevel calciner.

Following is a description with reference to the accompanying darwings of one embodiment of a transfer valve in accordance with the present invention.

Figure 1:
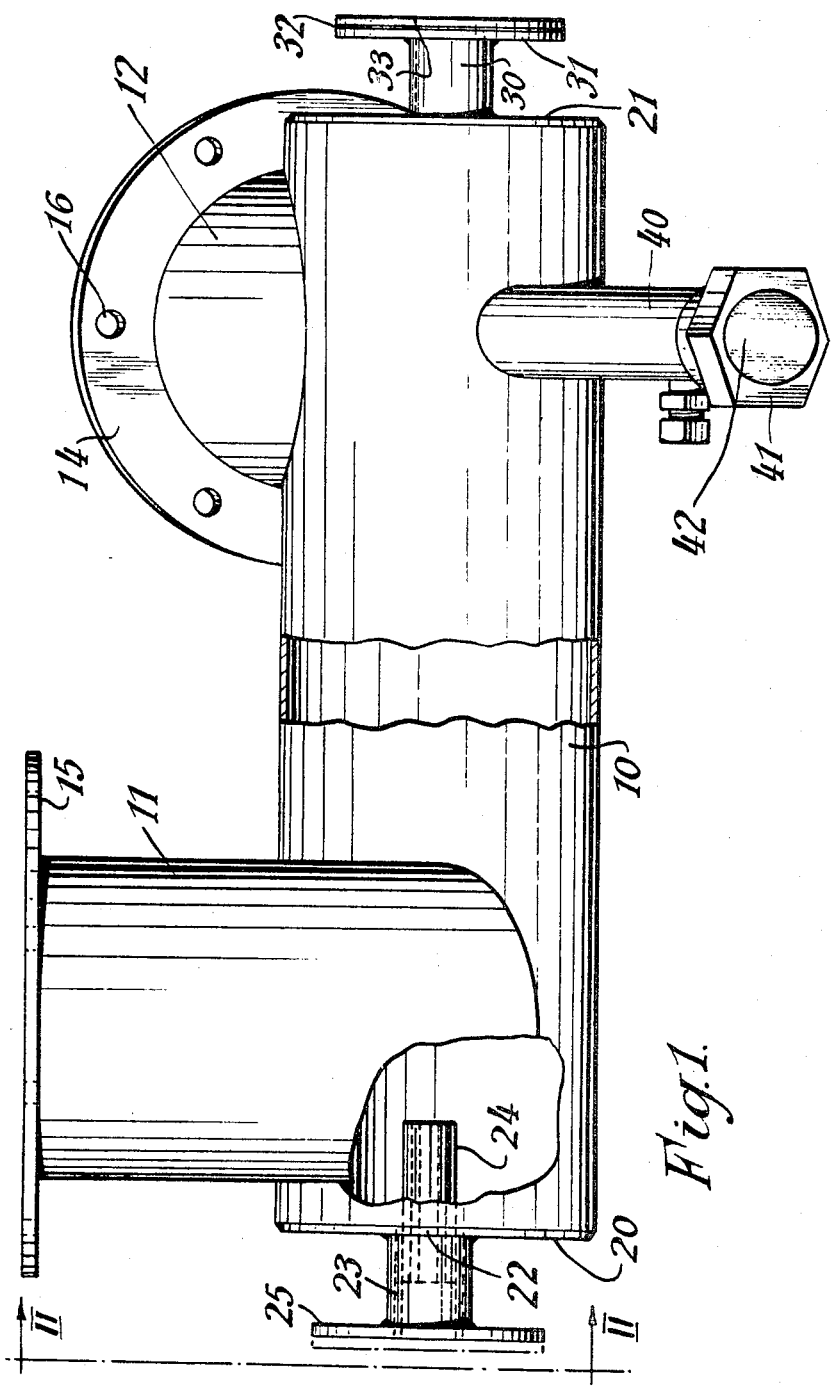
Figure 2:
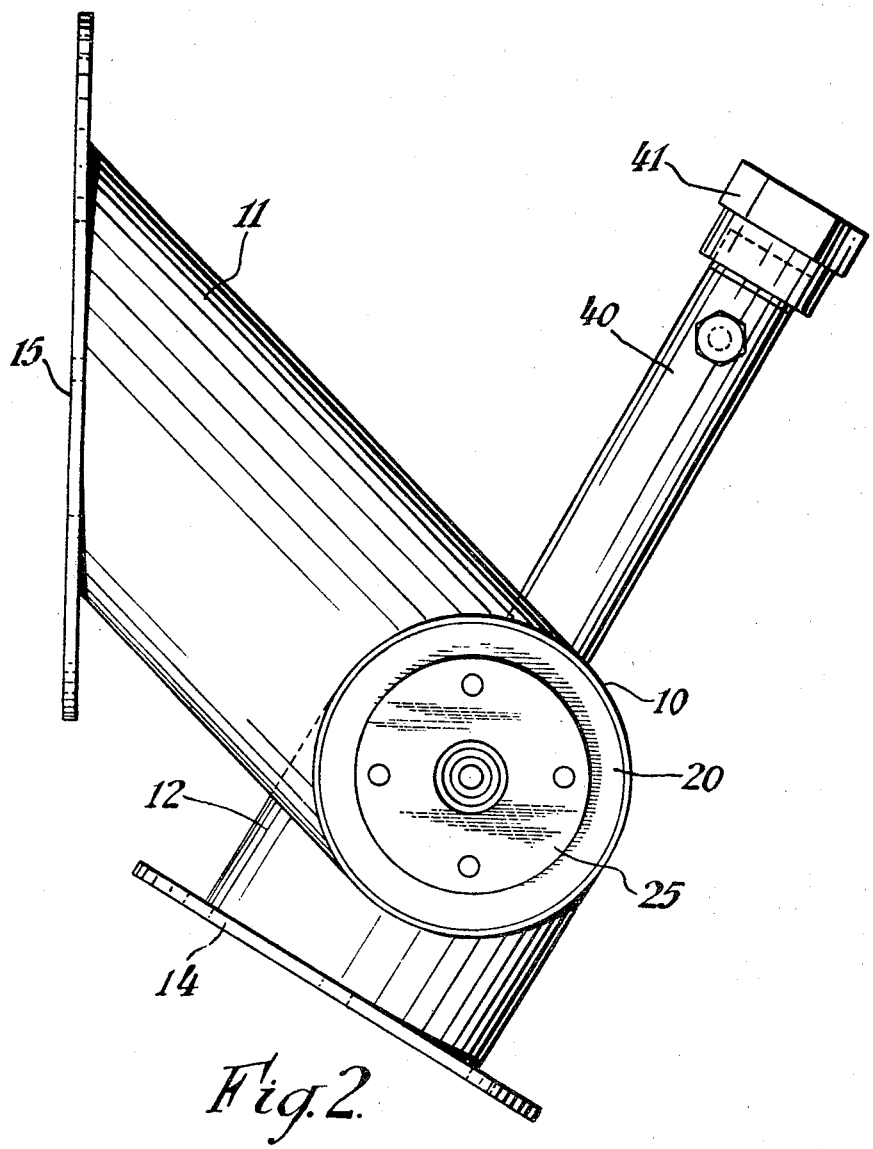

In the drawings:
FIGURE 1 is a plan view of the valve.
FIGURE 2 is an end elevation from the line II—II of FIGURE 1.
FIGURE 3 is a section through part of a calciner incorporating the valve of the present invention.
FIGURE 4 is a detail of FIGURE 3.
FIGURE 5 is a longitudinal section of the valve of the calciner shown in FIGURE 3.

The valve comprises a longitudinal tubular cylindrical body member 10 having towards a first end thereof a radially disposed inlet branch 11 substantially cylindrical in form and of substantially the same diameter as the diameter of the body member 10. The body member 10 is provided towards its second end with a radially disposed outlet branch 12 which is also cylindrical in form and has substantially the same diameter as the body member 10. The axis of the cylindrical inlet branch 11 and the axis of the cylindrical outlet branch 12 are each substantially perpendicular to the axis of said body member 10 and subtend an angle of substantially 105° at the axis of said body member.

The outlet branch 12 is provided toward its open end with a radially directed annular flange 14 having a plurality of holes 16 for attachment to the appliance into which the material passing through the valve is to be supplied. The inlet branch 11 terminates in a flange 15 disposed about the periphery of the open end of said inlet branch 11, said flange 15 and periphery being disposed in an oblique plane at an angle of substantially 45° to the axis of said inlet branch 11 the arrangement being such that the plane containing the flange of said inlet branch is at an angle of substantially 120° to the plane containing the annular flange of said outlet branch.

The cylindrical body portion 10 is closed at each end by means of an annular capping piece 20 and 21 provided with a central bore 22. The capping piece 20 at the first end of the body member 10 is provided in its bore 22 with a cylindrical tube 23 containing a concentrically disposed inner tube 24 which inner tube 24 projects inwardly of the first capping piece 20 of said body member and within the projection of the inner surface of the wall of the inlet branch 11 through said body member 10. The outer tube 23 is provided at its outer end with an annular flange 25 adapted to mate with a similar flange on a compressed air supply line.

The capping portion 21 at the second end of said body member is also provided with a substantially concentrically disposed cylindrical tube 30 carrying at its outer end a radially disposed flange 31. The opening in the outer end of said tube 30 at the second end of the body member 10 is closed by means of an asbestos board gasket 32 and a mild steel plate 33 clamped to said flange 31 to seal said end.

The body member 10 is provided with a radially projecting tube 40 substantially coaxial with said outlet branch 12, said tube 40 providing means for introducing additional material into the body member to flow out via said outlet branch 12 when the material is passing through the valve. In normal operation said additional inlet 40 is capped by means of a hexagonal cap 41 having a depending threaded skirt adapted to engage with the threaded end portion of said additional inlet 40. The hexagonal cap 41 is provided with a central inspection window 42 of heat resisting glass.

In operation, the valve is disposed for the purpose of transferring a flowable solids material from an upper level to a lower level, the inlet branch 11 being connected to said upper level and the outlet branch 12 of the valve being coupled to said lower level.

Typically, the transfer valve may be disposed between upper and lower beds of a multiple fluidised bed calciner or dryer for the purpose of transferring solids material from said upper bed to said lower bed wherein a gas pressure differential exists between said upper and said lower bed.

The material on the upper bed is caused or allowed to flow via said inlet branch 11 into said body member 10 which is disposed substantially horizontally so that the material builds up in said body member 10 to prevent further flow of solids material into said inlet branch 11 and at the same time to result in a substantial gas seal between said lower bed and said upper bed.

In order to effect transfer of material from said upper bed to said lower bed, compressed air is supplied via the inlet 23 and 24 in the capping piece 20 at the first end of the body member 10 to agitate the particles of the flowable particulate solids material located in said first end of the body member 10 to cause or allow transfer of the same horizontally along the body member 10 to said outlet branch 12 thus causing or allowing a flow of material from said inlet branch 11 via said body member 10 to said outlet branch 12. On stopping the supply of compressed air at said first end 20 of the body member 10, the solids material flowing in via said inlet branch 11 builds up in said body member 10 to form a seal therein and to effect a substantial gas seal between said upper and said lower beds.

In a second embodiment of the present invention the transfer valve forms an integral part of a multi-level calciner.

The calciner comprises a substantially erect cylindrical body 50 lined with refractory material 51. The cylindrical body 50 is reduced in diameter at its upper end 52 to provide a main body portion 53 and an upper body portion 52. The main body portion 53 is divided into two calcining levels 54 and 55 by means of a support arch 56 disposed across the cylindrical lower body portion 53 of the calciner to divide said main body portion 53 into an upper chamber 54 and a lower chamber 55. The support arch 56 is formed of a refractory material such as "Silmax 54."

A further support arch 57 is disposed across the main body portion 53 of the calciner towards the upper end thereof to separate the main body portion 53 from the upper body portion 52 thus providing a calciner having three calcining levels 52, 54 and 55. Each of the arches 56 and 57 is provided with a plurality of orifices or nozzles 90 to admit hot gases from the next lower level of the calciner to fluidise the material disposed in the calciner level above arches 56 and 57 respectively. The interior surface of the walls of the calciner are lined with a refractory material 51, such as "Silmax 75" and means 60 are provided for the transfer of material from the uppermost level 52 of the calciner to the intermediate level 54 and from the intermediate level 54 to the lowermost level 55 of the calciner (only part of which is shown).

The outer wall 61 of the main body portion 53 is provided with a horizontal longitudinal blister 62 of rectangular vertical cross section disposed with the upper wall 63 of the blister in a plane contained by the support arch 57 towards the lower end thereof. The walls of the blister 62 are lined with refractory material 64 and there is provided in the portion of the blister 62 adjacent the wall 61 of the calciner with a longitudinal passage 65 extending horizontally within the blister 62. The longitudinal passage 65 is arranged so that the inner wall 66 of the passage 65 is tangential to the circumference of the circle defining the periphery of the main body 53 of the calciner in the horizontal plane containing the longitudinal axis of the passage 65 in the blister 62. The lower part of the upper calcining level 52 is provided in a side wall thereof adjacent the support arch 57 disposed beneath said level 52 with a conduit 67 extending from said side wall through the layers of refractory material 51 to a first end 68 of the longitudinal passage 65 within the blister 62, said conduit 67 being disposed at an angle of substantially 45° to the vertical. The second end 69 of the longitudinal passage 65 within the blister 62 is provided with an outlet conduit 70 disposed at an angle of substantially 30° to the vertical and extending from the second end 69 of said passage 65 within the blister 62 through the refractory lining 51 of the intermediate level within the calciner to discharge in the side wall of said intermediate level 53 at a point below the horizontal plane containing the lower wall 71 of the blister.

The blister 62 is provided at its first and second ends, 68 and 69 respectively, with a cylindrical bore 72, 73 passing through the end walls of the blister 62 and through the refractory lining 64 to debouche into the first and second ends 68 and 69 respectively of the longitudinal passage 65. The opening 72 in the first end 68 is provided towards the outer end of said opening with a first cylindrical tube 74 passing through the outer part of the refractory lining 64 in the first end 68 of the blister 62 the inner end of said tube 74 carrying within its end a second tube 75 extending from the inner end of said first tube 74 through the remainder of the refractory lining 64 to debouche into the first end 68 of the longitudinal passage 65 within the blister 62 so that said inner tube 75 projects inwardly of the inner surface defining the first end 68 of said longitudinal passage 65. The outer tube 74 is provided at its outer end with an annular flange 76 adapted to mate with a similar flange on a compressed air supply line (not shown).

The opening 73 at the second end 69 of the blister is also provided with a cylindrical tube 77 carrying at its outer end a radially disposed flange 78. The axis of the opening 73 in the second end 69 of the blister 62 is substantially concentric with the opening 72 in the first end 68 thereof and is adapted to provide an opening whereby particulate material in the longitudinal passage 65 may be disturbed by passing a rod through the opening 73 in the second end 69 should this be necessary. The outer end of the tube 77 at the second end 69 of the blister 62 is closed by means of an asbestos board gasket and a mild steel plate 79 clamped to the flange 78 to seal said opening.

The blister 62 is further provided with a pair of cylindrical tubes 80 and 81 projecting outwardly with respect to the body 53 of the calciner one, 80, of which is substantially coaxial with the inlet passage 67 and the other 81, of which is substantially coaxial with said outlet passage 70. The tube 81 disposed substantially coaxial with the outlet passage 70 may serve as a means for introducing additional material into the longitudinal passage 65 within the blister 62 to flow out via the outlet 70 from said passage 65 when material is passing through the valve. In normal operation each of said projecting tubes 80 and 81 is capped by means of a hexagonal cap 83 having a depending threaded skirt adapted to engage with a thread end portion of said tube. The hexagonal cap 83 is provided with a central inspection window of heat resisting glass (not shown).

The operation of the valve forming an integral part of the calcining apparatus is similar to the operation of the valve described in the first embodiment referred to above.

A similar transfer valve is provided between the intermediate level 54 and the lower level 55 of the calciner.

I claim:

1. A multiple fluidised bed calciner or dryer comprising upper and lower beds said upper bed containing a particulate solids material which is to be transferred to said lower bed where a gas pressure differential exists between said upper and said lower beds, the improvement comprising a transfer valve consisting of a body member having spaced inlet and outlet means arranged for said solid material entering said inlet means to substantially seal said inlet means, and gas means adapted to act in said body member to subject material therein to a stream of compressed gas and to act upon said material sealing the inlet means to transfer said material from said inlet to said outlet thereby permitting a flow of solids material through said valve and to permit transfer of the material between said upper bed and said lower bed.

2. A calciner as claimed in claim 1 in which the gas means is a stream of compressed gas.

3. A calciner as claimed in claim 1 wherein the body member is a longitudinal cylindrical tube having towards a first end thereof, a radially disposed inlet branch substantially cylindrical in form and of substantially the same diameter as the diameter of the body.

4. A calciner as claimed in claim 3 wherein the body member of the transfer valve is provided towards its second end with a radially disposed inlet branch which is also cylindrical in form and has substantially the same diameter as the body member.

5. A calciner as claimed in claim 4 wherein the axis of the cylindrical inlet branch and the axis of the cylindrical outlet branch are each substantially perpendicular to the axis of the body member and subtend an angle of 105° with each other at the axis of the body member.

6. A calciner as claimed in claim 3 in which the cylindrical tubular body member is closed at each end by means of an annular capping piece provided with a central bore.

7. A calciner as claimed in claim 6 wherein the capping piece at the first end of the body member is provided in the bore with a cylindrical tube containing a concentrically disposed inner tube which inner tube projects inwardly of the first end of said body member and within the projection of the inner wall of the inlet branch along the longitudinal axis of said body member.

References Cited
UNITED STATES PATENTS

| | | |
|---|---|---|
| 533,929 | 2/1895 | Taylor. |
| 1,086,964 | 2/1914 | White _____ 302—47 X |
| 1,258,912 | 3/1918 | Kinyon et al. _____ 302—47 |
| 2,715,548 | 8/1955 | Fish _____ 302—29 |
| 2,726,137 | 12/1955 | Davis. |
| 3,266,788 | 8/1966 | Jukkola. |

FREDERICK L. MATTESON, JR., *Primary Examiner.*
R. A. DUA, *Assistant Examiner.*

U.S. Cl. X.R.
302—47; 34—57